(12) United States Patent
Li et al.

(10) Patent No.: US 11,030,157 B2
(45) Date of Patent: Jun. 8, 2021

(54) TEMPLATE BASED DATA REDUCTION FOR COMMERCIAL DATA MINING

(71) Applicant: NEC Laboratories America, Inc., Princeton, NJ (US)

(72) Inventors: Ding Li, West Windsor, NJ (US); Kangkook Jee, Princeton, NJ (US); Zhichun Li, Princeton, NJ (US); Mu Zhang, Plainsboro, NJ (US); Zhenyu Wu, Plainsboro, NJ (US)

(73) Assignee: NEC Corporation

( * ) Notice: Subject to any disclaimer, the term of this patent is extended or adjusted under 35 U.S.C. 154(b) by 455 days.

(21) Appl. No.: 15/979,514

(22) Filed: May 15, 2018

(65) Prior Publication Data

US 2018/0336218 A1 Nov. 22, 2018

Related U.S. Application Data

(60) Provisional application No. 62/507,928, filed on May 18, 2017.

(51) Int. Cl.
| | |
|---|---|
| *G06F 16/00* | (2019.01) |
| *G06F 16/174* | (2019.01) |
| *G06F 3/06* | (2006.01) |
| *G06K 9/62* | (2006.01) |
| *G06F 16/25* | (2019.01) |

(Continued)

(52) U.S. Cl.
CPC ........ *G06F 16/1744* (2019.01); *G06F 3/0643* (2013.01); *G06F 16/2246* (2019.01); *G06F 16/2272* (2019.01); *G06F 16/24568* (2019.01); *G06F 16/25* (2019.01); *G06F 16/258* (2019.01); *G06F 21/6218* (2013.01); *G06K 9/6219* (2013.01); *G06F 16/9027* (2019.01);

(Continued)

(58) Field of Classification Search
CPC ... G06F 16/2465; G06F 16/26; G06F 2216/03
USPC .................................................. 707/736, 776
See application file for complete search history.

(56) References Cited

U.S. PATENT DOCUMENTS

| | | | | |
|---|---|---|---|---|
| 9,501,345 B1* | 11/2016 | Lietz | ....................... | G06F 16/00 |
| | | | | 707/707 |
| 9,805,337 B2* | 10/2017 | Kraenzel | ................. | H04L 67/24 |
| | | | | 707/707 |

(Continued)

*Primary Examiner* — Alexandria Y Bromell
(74) *Attorney, Agent, or Firm* — Joseph Kolodka

(57) ABSTRACT

Systems and methods for mining and compressing commercial data including a network of point of sale devices to log commercial activity data including independent commercial events and corresponding dependent features. A middleware system is in communication with the network of point of sale devices to continuously collect and compress a stream of the commercial activity data and concurrently store the compressed commercial activity data. Compressing the stream includes a file access table corresponding to the commercial activity data, producing compressible file access templates (CFATs) according to frequent patterns of commercial activity data using the file access table, and replacing dependent feature sequences with a matching compressible file access template. A database is in communication with the middleware system to store the compressed commercial data. A commercial pattern analysis system is in communication with the database to determine patterns in commercial activities across the network of point of sale devices.

8 Claims, 7 Drawing Sheets

(51) Int. Cl.
  *G06F 16/22*     (2019.01)
  *G06F 16/2455*   (2019.01)
  *G06F 21/62*     (2013.01)
  *G06F 16/901*    (2019.01)
  *G06F 21/55*     (2013.01)

(52) U.S. Cl.
  CPC ........ *G06F 21/552* (2013.01); *G06F 2216/03* (2013.01); *G06F 2221/2143* (2013.01)

(56) References Cited

U.S. PATENT DOCUMENTS

| | | | | |
|---|---|---|---|---|
| 10,115,126 B1* | 10/2018 | Nash | ......................... | G01S 5/02 707/707 |
| 2010/0106710 A1* | 4/2010 | Nishizawa | ........ | G06F 16/24556 707/714 |
| 2013/0018779 A1* | 1/2013 | Laquerre | ................ | G06Q 40/02 705/39 |
| 2015/0206118 A1* | 7/2015 | Cummins | .......... | G06Q 30/0623 705/21 |
| 2015/0345969 A1* | 12/2015 | McGavran | .......... | G06Q 30/0205 701/409 |
| 2016/0239813 A1* | 8/2016 | Ko | ..................... | G06Q 20/0655 707/707 |
| 2016/0335243 A1* | 11/2016 | Zhai | ..................... | G06F 16/2228 707/707 |
| 2017/0076560 A1* | 3/2017 | Dasilva | .................. | G06Q 30/06 707/776 |
| 2017/0178149 A1* | 6/2017 | Morimura | .......... | G06Q 30/0201 707/707 |
| 2018/0087660 A1* | 3/2018 | Mills | .................... | F15B 13/085 707/707 |
| 2018/0315074 A1* | 11/2018 | Nash | .................. | G06Q 30/0268 707/707 |
| 2018/0315089 A1* | 11/2018 | Nash | ...................... | H04W 4/02 707/707 |
| 2019/0019507 A1* | 1/2019 | Abrahams | ........... | G06F 16/3329 707/707 |
| 2019/0251622 A1* | 8/2019 | Wiedmeyer | ........ | G06Q 30/0623 707/707 |
| 2020/0174966 A1* | 6/2020 | Szczepanik | ........... | G06F 16/116 707/707 |

\* cited by examiner

TEMPLATE BASED DATA REDUCTION FOR COMMERCIAL DATA MINING

RELATED APPLICATION INFORMATION

This application claims priority to 62/507,928, filed on May 18, 2017, incorporated herein by reference in its entirety. This application is related to an application entitled "TEMPLATE BASED DATA REDUCTION FOR SECURITY RELATED INFORMATION FLOW DATA", Ser. No. 15/979,512 and which is incorporated by reference herein in its entirety.

BACKGROUND

Technical Field

The present invention relates to data reduction and more particularly template based data reduction.

Description of the Related Art

Many aspects of business activities utilize large amounts of data. In particular, businesses often collect and analyze large volumes of data, known as "big data", for applications such as security monitoring, behavior tracking, web data mining, among other areas. This large data volume occupies equally large infrastructure, such as storage space, energy, and computational resources. Compressing the data for more efficient collection and analysis can result in the loss or deterioration of the collected data.

SUMMARY

According to an aspect of the present principles, a system is provided for mining and compressing commercial data. The system including a network of point of sale devices to log commercial activity data, the commercial activity data including at least one type of independent commercial event and corresponding dependent features. A middleware system is in communication with the network of point of sale devices to continuously collect and compress a stream of the commercial activity data from the network of point of sale devices and concurrently store compressed commercial activity data corresponding to the commercial activity data of the stream, wherein compressing the stream includes a file access table corresponding to the commercial activity data, producing compressible file access templates (CFATs) according to frequent patterns of commercial activity data using the file access table, and replacing dependent feature sequences with a matching compressible file access template. A database is in communication with the middleware system to store the compressed commercial data. A commercial pattern analysis system is in communication with the database to determine patterns in commercial activities across the network of point of sale devices.

According to an aspect of the present principles, a system is provided for mining and compressing commercial data. The system including a network of point of sale devices to log commercial activity data, the commercial activity data including at least one type of independent commercial event and corresponding dependent features. A memory is in communication with the network of point of sale devices to temporarily collect a stream of the commercial activity data. A middleware processor is in communication with the memory to compress the stream of the commercial activity data from the network of point of sale devices and concurrently store compressed commercial activity data corresponding to the commercial activity data of the stream, wherein compressing the stream includes producing compressible file access templates (CFATs) according to frequent patterns of commercial activity data. A buffer is in communication with the middleware processor to replacing dependent feature sequences with a matching compressible file access template. A database is in communication with the buffer to store the compressed commercial data. A commercial pattern analysis system is in communication with the database to determine patterns in commercial activities across the network of point of sale devices.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
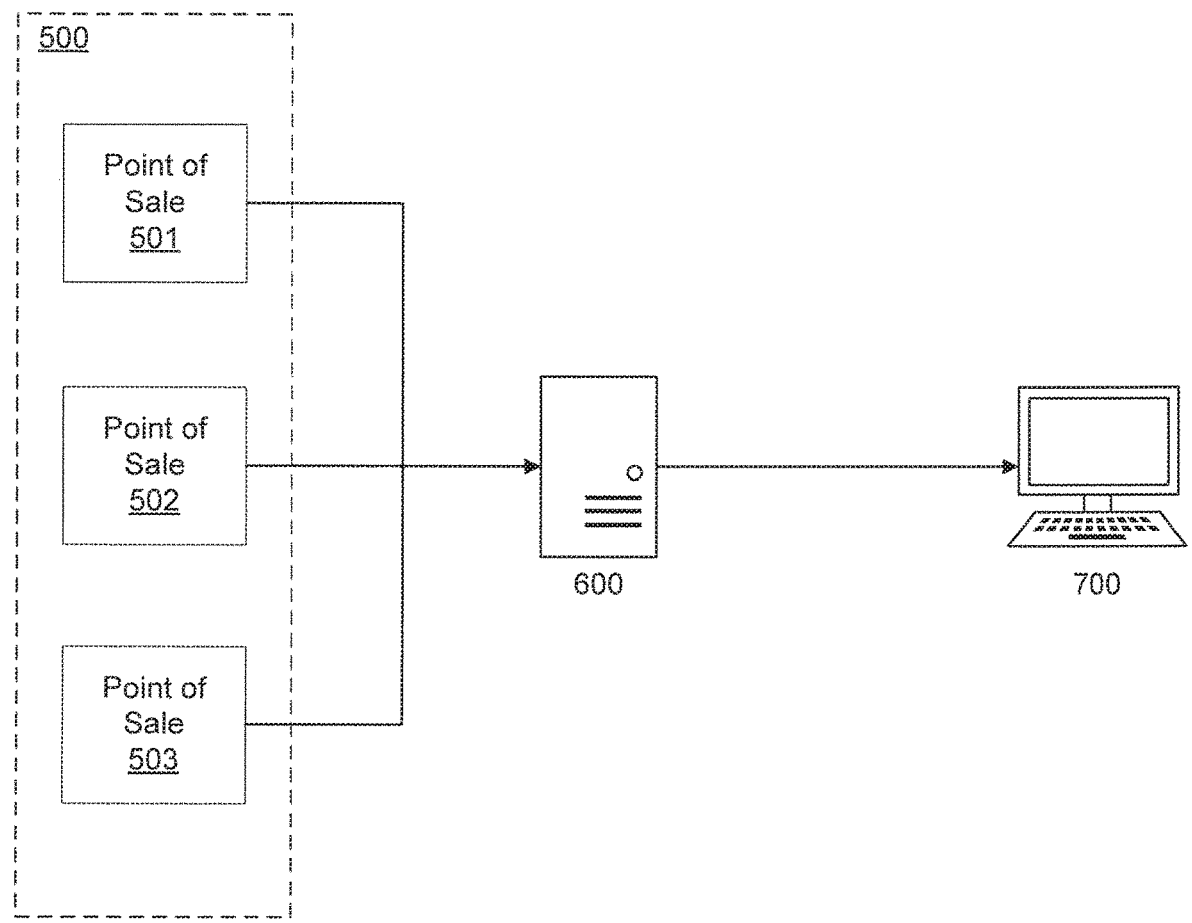
FIG. 1 is a block/flow diagram illustrating a high-level system/method for template based data reduction for security related information flow data (SRIFD), in accordance with the present principles.

In accordance with the present principles, systems and methods are provided for a template based data reduction methodology that results in a high degree of data reduction with a low risk of deterioration.

In one embodiment, fixed sets of libraries are leveraged to reduce an amount of stored data. Because programs load fixed sets of libraries and resources in the initial stages of being run, the fixed sets of libraries and resources can be considered a single file. Accordingly, the libraries and resources may be shared by various programs. A template can, therefore, be created that associates processes with the files representing the libraries and resources accessed by the process. Thus, files that are utilized by multiple different processes can be compressed without any loss of information In particular, the templates may contain data pertaining to Security Related Information Flow Data (SFRID). Because security monitor can involve monitoring the flow of dependencies in each computer on a network, the SFRID data can become extremely large. However, by organizing the data into a template with the libraries and resources saved as files, those files can be organized in templates and associated with the multiple processes that access them. A frequent-pattern tree (FP-Tree) can then be built and pruned of branches with low data reduction capabilities. The remaining branches can form a compressible template. A frequent-pattern growth (FP-growth) algorithm can then be used to determine frequent item patterns based on the compressed data with low risk of any information loss.

As a result, the analysis requires fewer resources to store and process, and is thus less costly and faster to analyze.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level system/method for template based data reduction for security related information flow data (SRIFD) is illustratively depicted in accordance with one embodiment of the present principles.

In one embodiment, an online monitoring and analysis system is contemplated. This online retail monitoring and analysis system (hereinafter "ORMA system") can the monitoring and analysis of a group of points of sale 500 both independent features or events, and dependent features or events. For example, as purchases are made at each point of sale 500, independent features, such as, e.g., a time stamps or customer identifiers are recorded, as well as dependent features, such as, e.g., money spent, items purchased, or other dependent feature associated with independent feature. For example, because commercial behavior can generate a large amount of data, particular for a large organization, it can be beneficial to use that data to find patterns in commercial trends, such as, e.g., patterns associated between customers and items a customer purchases, time of day or day of the week or month, and amount spent at that time, among any other patterns. In one embodiment, a customer can purchase a set of items at the point of sale 501, 502 or 503. Each point of sale 501, 502 and 503 may part of a network, e.g., the internet, as a networked point of sale in a physical store, or as an ecommerce site. An identifier for the independent feature for which patterns are to be determined, is recorded. Such an identifier could identify the customer, the time of day, the day of the week, the location, among other independent variables of the commercial behavior being performed. Associated dependent features, including variables such as the items purchased, amount spent, among other dependent variables that may form a pattern are also recorded in association with the corresponding independent feature. For example, items purchased may be associated with a customer ID corresponding to the purchaser. Thus, a log of the events is continually growing for the point of sale network 500.

Big data processing middleware 600 can be used to receive the log of events as an event stream. The event stream can be received, e.g., either at a set time, or in a continuous stream. If received in a continuous stream, the event stream can occur, e.g., either concurrently with the recording of the event log, or in a delayed fashion. The big data processing middleware 600 can receive and store the data pertaining to the event stream from all devices of the point of sale network 500. As a result, the big data processing middleware 600 can include, e.g., a server or farm of servers, a cloud, a mainframe, or any other system or device suitable for accepting and processing the data from the point of sale network 500. Processing of the data can include, e.g., data collection, sanitization, reduction, indexing, storage, and other processes. For example, because the event stream contains logs of event data from every event of each point of sale in the point of sale network 500, a large volume of data is being received by the big data processing middleware 600. Thus, for effective indexing, storage and later analysis, a data reduction scheme that can effectively compress the data without losing or degrading the information is beneficial to the ORMA system. Indeed, effective data reduction can result in less storage space used by the big data processing middleware 600, fewer resources required to index the data, fewer resources required to send the data to an analysis system 700, among other benefits. Accordingly, the big data processing middleware 600 with an effective data reduction scheme can improve the performance, efficiency and cost of the ORMA system.

Upon being processed by the big data processing middleware 600, the event stream may be received by the analysis system 700. The analysis system 700 analyzes the recorded data in the event stream including all processes, files, libraries, resources, etc. For example, the analysis system 700 can include, e.g., a pattern analysis system for analyzing commercial consumer behavior across a point of sale network 500. The analysis system 700 can, therefore, access the compressed data from the big data processing middleware 600 to analyze the behavior of consumers to find patterns, such as, e.g., patterns in what customers is interested in which types of items, what customers tend to purchase in what period, what time is results in what relative amount of sales of a particular item, among others and combinations thereof. In doing so, the analysis system 700 tracks the interaction of, e.g., consumers, time and items.

To accurately determine commercial behavior, the accuracy of the data being analyzed is important. If the data contains errors, such as, e.g., errors introduced during data reduction, an incorrect pattern may be drawn, thus costing money to an entity. However, by not reducing the data, a robust analysis may not be feasible. Thus, the reduction of data at the big data processing middleware 600 assists with increasing the speed and accuracy of the analysis system 700 by reducing the resource requirements of transferring and processing the potentially enormous amount of commercial data from the point of sale network 500, increasing the accuracy and timeliness of the determined patterns, and thus increasing revenue.

Figure 2:
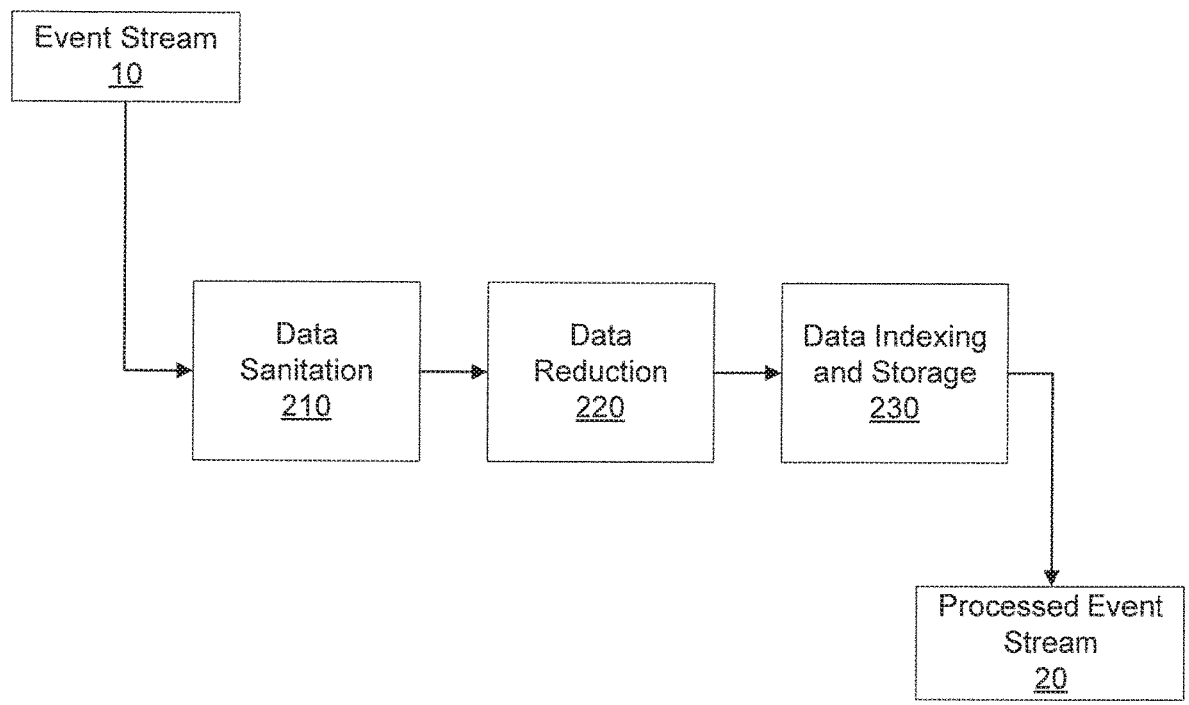
FIG. 2 is a block/flow diagram illustrating a system/method for template based data reduction, in accordance with the present principles.

Referring now to FIG. 2, a system/method for template based data reduction is illustratively depicted in accordance with an embodiment of the present principles.

According to aspects of an embodiment of the present invention, an OMA system can include a data processing to sanitize, reduce, index and store the data of the event stream. Thus, the big data processing middleware 200 may include, e.g, a data sanitization module 210, a data reduction module 220 and a data indexing and storage module 230, among other data processing modules.

The data sanitization module 210 receives the event stream 11 from the computers 100. To prevent noise and errors in the data received from the event stream 11, the data sanitization modules 210 ensures that the data can be written to a clean storage space. Accordingly, the data sanitization module 210 will remove old data from a memory, such as, e.g., a random access memory (RAM), hard disk, flash storage, cache, or other type of memory.

According to aspects of an embodiment of the present invention, the data sanitization module 210 will remove data according to a first-in-first-out (FIFO) scheme. According to the FIFO scheme, if the memory reaches capacity while the event stream 11 is still being received, the data sanitization module 210 will determine the oldest recorded process received according to a start time stamp for the processes, remove that oldest process, and store the newly received process of the event stream 11. Accordingly, errors from incomplete data and overwritten data can be avoided.

The data from the event stream 11 can then be reduced by the data reduction module 220. According to aspects of the invention, the data reduction module 220 can be configured in an online, streaming configuration, rather than an offline configuration. As mentioned above, the event stream 11 may contain more data than can be held at one time by memory. Indeed, the computational costs of storing a large amount of data prior to compression can be extremely high, both in terms of processing requirements, as well as storage capacity. As a result, data in the event stream 11 can be reduced while the event stream 11 is still being received. Accordingly, the data reduction module 220 reduces data and passes it to the data indexing and storage module 230 before memory capacity is reached, or before the data sanitization module 210 removes a process that has yet to be reduced.

Upon data reduction, the reduced data from the event stream 11 can be received by the data indexing and storage module 230. The data indexing and storage module 230 can format the data such that the data can be stored in a memory, such as, e.g., a database, a server, a mainframe, a hard disk, a flash drive, a solid-state drive, or any other memory or storage device. The indexing the data will allow for subsequent processing, such as, e.g., analysis by analysis applications 300 (for example, a dependency analysis application), to efficiently find the reduced data for more efficient processing and analysis.

Figure 3:
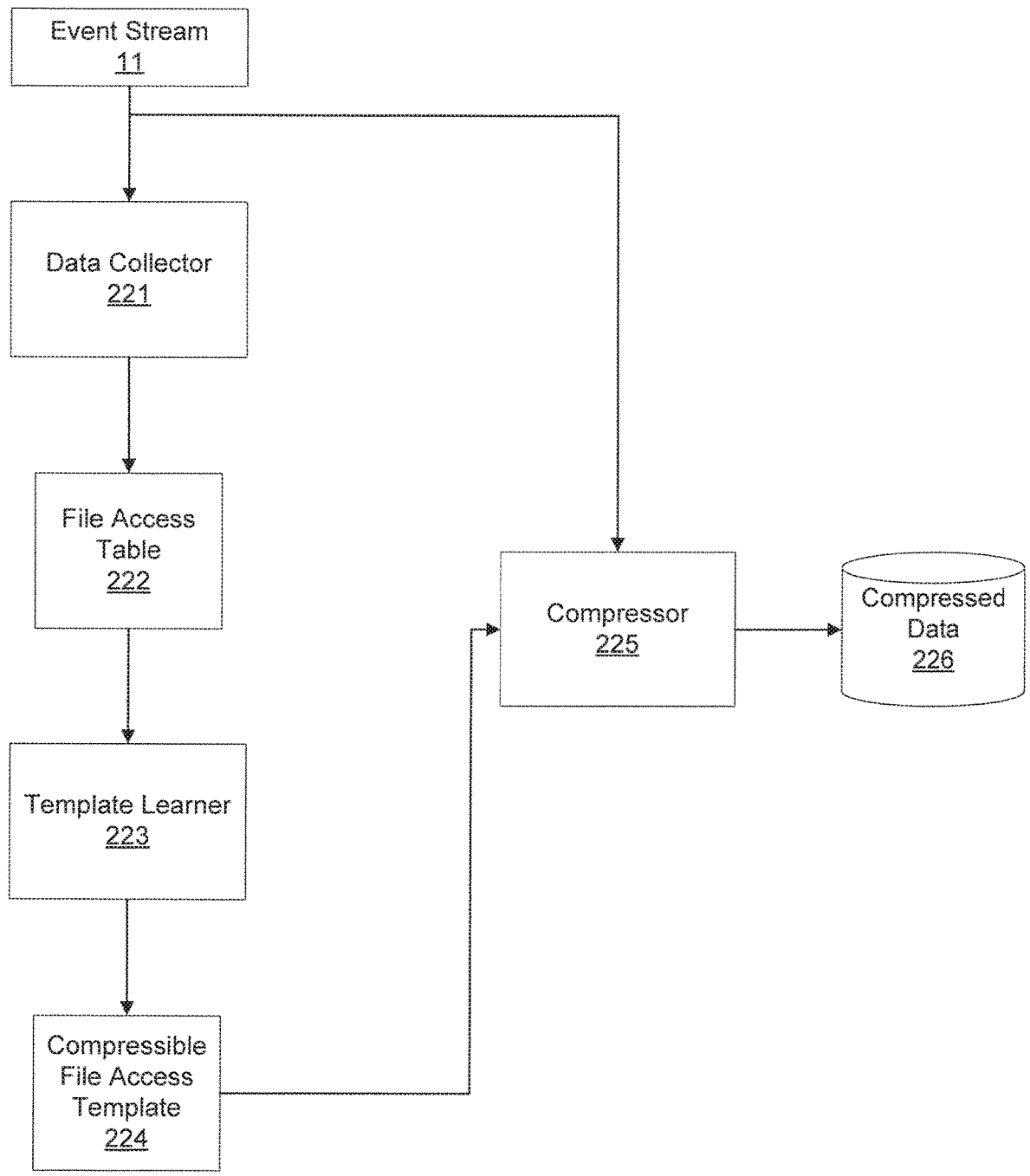
FIG. 3 is a block/flow diagram illustrating a system/method for template based data reduction, in accordance with the present principles.

Referring now to FIG. 3, a system/method for template based data reduction is illustratively depicted in accordance with an embodiment of the present principles.

According to aspects of an embodiment of the present invention, a data reduction module 220 of the big data processing middleware 200 can include modules for organizing and compressing data of the event stream 11.

The data reduction module 220 can reduce data by, e.g., collecting and organizing the data with a data collector 221. As discussed above, the data of the event stream 11 can include processes and corresponding files. In particular, the corresponding files can include, e.g., files accessed in an initial stage of a process. To determine if a file is accessed in an initial stage of a process, the data collector 221 can analyze a process start even, including, e.g., a start time stamp. Similarly, the files may also include an access event start time for the time at which the file was accessed by the process. The data collector 221 can then compare the process start time stamp with the file access event time stamp and determine if a difference is within an initial stage duration d. The initial stage duration d may be, e.g., a pre-determined duration, or an adjustable threshold according to, e.g., a desired degree of data reduction.

Upon collecting the processes and determining the files accessed in initial stages of the processes, the data collector 221 can add the data to the cache. The cache can be organized by the data collector 221 in, e.g., a file access table (FAT) 222. For each unique process, a new row is created in the FAT 222 corresponding to the unique process. Each row of the FAT 222 can include, e.g., two columns; a process ID column, and a file column. Accordingly, a process ID of the newly added unique process will be entered into the process ID column. Files accessed in the initial stages of the newly added unique process, as determined by the data collector 221 as discussed above, are inserted into the file column of the FAT 222. As new rows are added, old data may be removed according a FIFO scheme, as discussed above. Thus, the processes with the oldest start time stamp will be wiped from the FAT 222 first to make room for the newly added process. An example of a FAT generated by the data collector 221 for processes P1, P2, P3, P4, and P5 can be seen in Table 1 below.

TABLE 1

| Process ID | Files |
| --- | --- |
| P1 | F1, F2, F3, F4, F5, F7 |
| P2 | F2, F4, F7 |

TABLE 1-continued

| Process ID | Files |
|---|---|
| P3 | F6, F7 |
| P4 | F2, F3, F4 |
| P5 | F2, F3, F4 |

To balance data reduction accuracy with computational resources, the FAT 222 may be set to a maximum size s. The maximum size s may be, e.g., user configurable, pre-determined, or automatically adjusting according to a size of the cache. Setting the maximum size s of the FAT 222 to a small size will be more economical in resource usage, while setting the maximum size s to a relatively larger value will increase robustness to data bursts.

A template learner 223 can then use the FAT 222 to learn and generate templates according to frequent patterns about how files are accessed by different processes. Accordingly, the template learner 223 will periodically check the FAT 222 for new data from the event stream 11. The template learner 223 will then analyze the new data to generate or update corresponding templates. Once a set of templates corresponding to the data in the FAT 222, the FAT 222 is cleared to make room for new data in the event stream 11. According to aspects of the present invention, the templates may be generated as compressible file access templates (CFATs) 224 to facilitate compressing data.

Generation the CFATs 224 can be performed by finding frequent path combinations. The more frequent a path combination, the more data can be reduced using a template corresponding to the path combination. Accordingly, frequent path combinations can be identified using, e.g., selective CFAT discovering. Because the event stream 11 can provide extremely large amounts of data that can result in very long single paths of files, determining every combination using, e.g., FP-Growth, can be very resource intensive. Therefore, according to one possible embodiment, the template learner can selectively discover frequent path combinations with a selective CFAT discovering scheme. Accordingly, the template learner 223 can first generate an FP-Tree from the data in the FAT 222, identify segment candidates in single paths and merge the nodes of each single path of the FP-Tree into a special node, discover all combinations of each path in the FP-Tree using the special nodes, and then selecting segment candidates that maximize the data reduction rate during compression to create a CFAT 224 corresponding to each selected segment candidate.

The CFATs 224 can then be employed by a compressor 225 as, e.g., a finite state automaton (FSA), to compress data in the event stream 11. To facilitate matching file IDs of a process to a CFAT 224, the file IDs of each segment of the CFAT 224 can be ordered according to the file IDs, for example, in ascending order of file ID numbers. Other ordering schemes, however, are contemplated. Then, the compressor 225 can generate the FSA as a set of strings, with each string corresponding to the ordered file IDs of a corresponding CFAT 224. Thus, comparison of the CFATs 224 to data in the event stream 11 is simple and efficient.

The compressor 225 will analyze the data of the event stream 11 and compare it to the CFATs 224. In particular, the compressor 225 can form a temporary FAT in its buffer that lists processes of the event stream 11 and corresponding files accessed at initial stages of each process. To facilitate the analysis, the file IDs of each process can be order in the temporary FAT according to, e.g., ascending numerical order of file ID numbers. Other ordering schemes, however, are contemplated. The compressor 225 can then compare the files of a given process with the CFATs 224 by, e.g., matching file ID combinations with those of the FSA. According to this analysis, the compressor 225 can replace the files of a matched process with a special event corresponding to the matched CFAT 224. Thus, the process and corresponding special event can be stored as compressed data 226 in a smaller size than if the file IDs of the process are stored explicitly.

The data reduction module 220 can be configured to operate as an online data reduction module such that bursts of data will only minimally affect the end results of the data reduction. In particular, the data collector 221 can organize and cache the most recent streamed data into, e.g., a cache including the FAT 222 on a local disk of the big data processing middleware 200. Thus, the most recent data of the event stream is added to the FAT 222 for template learning by the template learner 223. The template learner 223 can then learn templates according to the data in the FAT 222 on a continual basis, as discussed above. Therefore, the resulting CFATs 224 can be used to compress corresponding data with the compressor 225 on a continual basis and store the compressed data 226 in a storage. Thus, a burst of data that overwhelms the size of the cache storing the FAT 222 will only affect the template entries that would correspond to the data lost by in the burst, as opposed to compromising the integrity of all of the data in storage. Thus, the data reduction module 220 facilitates robustness against data bursts from the event stream 11 by continually receiving, caching, and reducing data in an online scheme.

Figure 4:
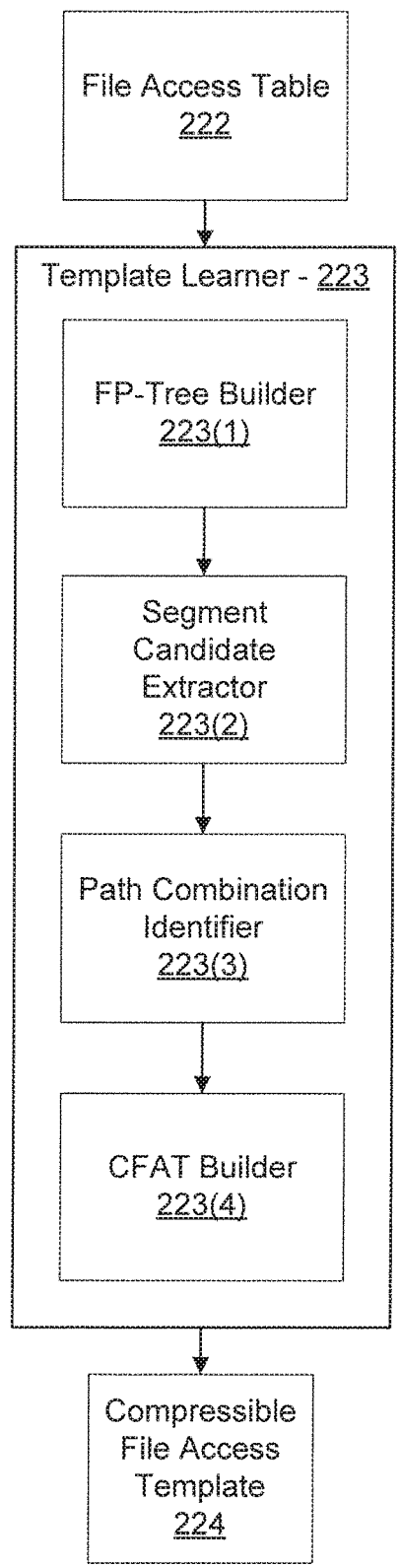
FIG. 4 is a block/flow diagram illustrating a system/method for template learning for template based data reduction, in accordance with the present principles.

Referring now to FIG. 4, a system/method for template learning for template based data reduction is illustratively depicted in accordance with an embodiment of the present principles.

The template learner 223 generates a set of compressible file access templates (CFATs) 224 corresponding to frequently accessed file combinations in the initial stages of a process. As discussed above, because the data of the event stream 11 can become very large, reducing the computational requirements of determining the frequent combinations can have large benefits in the speed and efficiency of building each CFAT 224. Reducing these computational requirements by using a process that quickly produces CFATs 224 from the data in the FAT 222 facilitates an online approach to data reduction. Thus, data can be added to the FAT 222, analyzed by the template learner 223 to produce CFATs 224 and compress the event stream 11 in a continual fashion. Therefore, overwhelming the memory for storing the FAT 222 can be prevent and storage space can be minimized by only keeping the raw data of the FAT 222 for a limited amount of time before compression.

Accordingly, as discussed above, a selective CFAT discovering scheme can be employed by the template learner 223. Such a scheme can include an FP-Tree builder 223(1), a segment candidate extractor 223(2) for extracting segment candidates from each single path of the FP-Tree and replacing each single path with a special node, a path combination identifier 223(3) for determining all path combinations of the FP-Tree with the single paths replaced with special nodes, and a CFAT builder 223(4) for selecting independent templates that maximize data reduction and produce corresponding CFATs 224.

Figure 5:
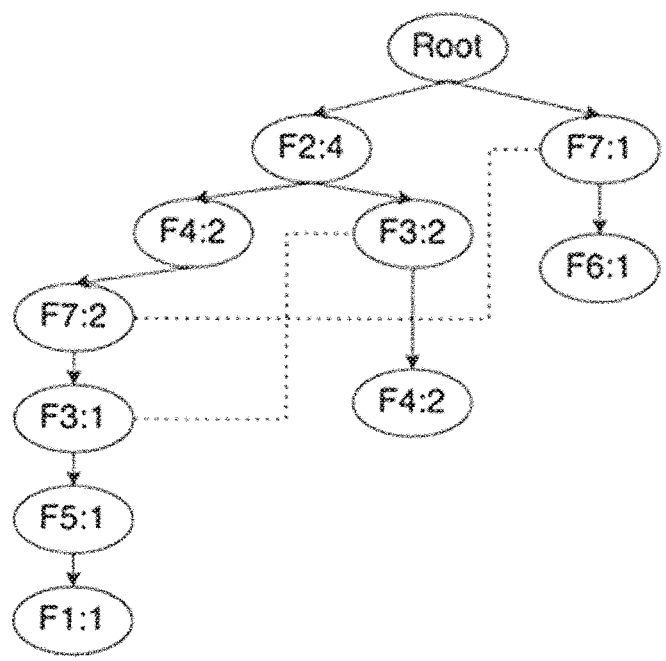
FIG. 5 is a block/flow diagram illustrating a system/method for data reduction in a frequent-pattern tree for a compressible file access template (CFAT) in template based data reduction for SRIFD, in accordance with the present principles.

According to aspects of the present embodiment, the FP-Tree builder 223(1) builds an FP-Tree, such as the FP-Tree illustrated in FIG. 5. Accordingly, the priority of each file is determined by counting occurrences across the processes present in the FAT 222. The FP-Tree builder 223(1) will then set the priority in descending order of frequency of occurrence. Once ordered, a root node of the FP-Tree is set and the FP-Tree builder 223(1) scans each row of the FAT 222. For each row, files are recursively added to the FP-Tree. If a file has the same identification of a current node, then the counter for the current node is increased by one, and the next file is analyzed. If, however, the file ID is different from the current node, a new node is created as a child of the current node. Each file in the FAT 222 is analyzed and recursively added to the FP-Tree.

In the event that the FP-Tree is large with infrequently accessed paths according to file counters, the FP-Tree builder 223(1) can prune the FP-Tree. Indeed, in some applications, such as, e.g., for SRIFD, certain paths in the FP-Tree will be much more heavily used than some other paths, with some paths rarely being used at all. Pruning can be performed using any suitable process for removing infrequently accessed paths, such as, e.g., FP-Tree trimming, weakly dominated path (WDP) merging, among others. FP-Tree pruning can accelerate the template learning process by reducing the number of nodes in the FP-Tree, thus making the template learner 223 faster and more efficient.

For example, in FP-Tree trimming, the FP-Tree builder 223(1) can compare a node counter to a counter associated with the root to determine a utilization ratio. The utilization ratio, therefore, signifies that rate at which a given file is accessed with its parent in a process compared to a total number of patterns signified by the counter of root. If a given node has a utilization ratio that is less than some threshold, then it will be removed from the FP-Tree, thus pruning the FP-Tree of infrequently accessed paths.

As another example, the FP-Tree builder 223(1) can prune the FP-Tree with WDP merging. A WDP is a path in the FP-Tree where all nodes in the path are approximately equal. While a WDP can include only nodes that are exactly equal, the nodes of the path may, instead, be within some deviation σ. Thus, a path may be considered a WDP if it includes a set of nodes where the first node p1 and the last node p2 are the same or within the deviation σ. This can be determined by an equation, such as, e.g., equation 2 below:

$$(1-\sigma) < \frac{p1.counter}{p2.counter} < (1+\sigma) \qquad \text{Equation 2}$$

If the path from p1 to p2 is the longest path for which the weakly dominated relationship holds true, then the path from p1 to p2 is a WDP. Accordingly, each node along the WDP can be merged into a single node to reduce the depth of the FP-Tree. Accordingly, the FP-Tree can be made smaller such that the template learner 223 can more efficiently and more quickly process the FP-Tree by not having to analyze low frequency nodes.

The segment candidate extractor 223(2) can then employ the FP-Tree for extracting segment candidates that maximize data reduction of paths in the FP-Tree. According to an embodiment of the present invention, the segment candidate extractor 223(2) can identify all single paths of the tree. A single path can include a section of a branch where each parent node has only one child node, and each child node has only one parent node. Every segment within each single path, including various combinations of segments, can be listed as segment candidates provided that each segment occurs a minimum number of times according to a threshold k. The threshold can be any desired value greater than zero. However, a threshold k may be chosen that maximizes data reduction, e.g., by setting the threshold k to greater than 1, or other value depending on the desired data reduction. A larger threshold k increases the likelihood that a given segment candidate can be reused for representing data in the FAT 222. However, a higher threshold k also can reduce the length of the segment, thus reducing the amount of data represented by the segment. Upon forming the list of segment candidates, the segment candidate extractor 223(2) can merge the nodes of each single path into a single special node corresponding to each single path, resulting in a reduced FP-Tree.

To form a list of template segments from the segment candidates, the segment candidate extractor 223(2) assesses each segment candidate for a data reduction score. The data reduction score indicates the degree to which the segment candidate can reduce data size. In particular, a segment candidate takes up space in memory in accordance with its size while the corresponding file data requires memory space in accordance with the frequency. Thus, the data reduction score for a given segment candidate is a function of the size of the segment candidate, and the frequency of the segment candidate. For example, the score could be determined, e.g., in accordance with the following equation 1:

$$\text{score} = t \cdot \text{size} \times t \cdot \text{freq} - t \cdot \text{size} - t \cdot \text{freq} \qquad \text{Equation 1:}$$

Upon scoring each segment candidate, the list of segment candidates can be ordered according to score in descending order. Because there may be segment candidates that intersect, and thus cause redundancy, the segment candidate with the larger data reduction score should be added to a final segment list to maximize data reduction.

According to aspects of an embodiment of the present invention, the segment candidate extractor 223(2) chooses the segment candidates in the final list to prevent intersection between segment candidates in the list. Accordingly, the segment candidate extractor 223(2) can compare each segment candidate to each other segment candidate. Thus, the segment candidate extractor 223(2) can iteratively select segment candidates for the final segment list according to, e.g., a greedy algorithm. Other algorithms may be used, however, a greedy method is computationally inexpensive and provides good data reduction results. Thus, the final template list can be created by iteratively adding the segment candidates to the final segment list. During the iteration, a current segment candidate is compared to each segment in the final segment list to determine if it intersects with any of the final segment list segments. If the given segment candidate does intersect with a segment in the final segment list, then the candidate is not added to the final segment list. If no intersection exists, then the segment candidate is added to the final segment list. Accordingly, the special node for each single path can be associated with a final segment list of segments in that single path that maximizes data reduction.

Using the final segment list and the reduced FP-Tree in which single paths have been merged in corresponding special nodes, the path combination identifier 223(3) can identify all path combinations in the reduced FP-Tree. As discussed above, the length of single paths affects the number of combinations of the paths of the FP-Tree, so the reduced FP-Tree can be processed by the path combination identifier 223(4) much more quickly by reducing the length of each single path into a special node. Thus, the path combinations can be identified with frequent path identification method such as, e.g., FP-Growth, or any suitable frequent path identification method.

In each combination identified by the path combination identifier 223(4), the final segment lists can take the place of corresponding special nodes to generate a template candidate for each combination.

Similar to scoring the segment candidates above with the segment candidate extractor (223(2)), the CFAT builder 223(4) can score each template candidate according to its data reduction rate using, e.g., equation 1 above. The template candidates can then be ordered according to score such as, e.g., in descending order.

To maximize data reduction, redundancy of templates should be avoided. Thus, the CFAT builder 223(4) can compare each template candidate to all other template candidates to determine if the template candidate subsumes, or is subsumed by another. Put another way, template candidates that have overlapping path combinations will result in the removal of the template candidate with a lower data reduction score. Accordingly, the CFAT builder 223(4) can choose the template candidates in the final list according to, e.g., a greedy algorithm, or any suitable process. For example, the final template list can be iteratively chosen by checking each template candidate against each template in the final template list to determine if the current template candidate subsumes, or is subsumed by any templates in the final template list. If yes, the current template is skipped. If no, the current template is added to the final list. Thus, redundancy is avoided. By iterating through the template candidates according to descending score, only the largest templates are added to the final template list, with redundant template candidates of a smaller score being discarded. As a result, the final template list will include templates corresponding to a set of path combinations of the FP-Tree that maximize data reduction when applied to the data of the event stream 11. Thus, the CFAT builder 223(4) produces a set of CFATs 224 corresponding to each template of the final template list for compressing the data of the event stream 11.

Referring now to FIG. 5, a system/method for data reduction in frequent-pattern tree for a compressible file access template (CFAT) in template based data reduction for SRIFD is illustratively depicted in accordance with an embodiment of the present principles.

According to aspects of the present invention, the data collector 221 can generate the FAT 222 such as Table 1, as discussed above, relating processes to corresponding files accessed in the initial stages of the process. The FAT 222 can also then organize the file access table in a frequent-pattern tree (FP-Tree). An example of a FP-Tree corresponding to the example file access table of Table 1 is depicted in FIG. 4.

In particular, the items of the FP-Tree are labeled in the format of "file-name:frequency". Thus, process P1 includes one instance of file F2, which is shared with processes P2, P4, and P5. Moreover, as the common file of each of the processes P1, P2, P4 and P5, F2 can form a common node in a branch including subbranches corresponding to each of these processes. Thus, file F2 has four instances in a particular branch and appears as "F2:4".

In contrast, process P3 does not share a common single path from a node with any other process, and thus forms a single path as a distinct branch from root. However, file F7, which appears in the branch for process P3, also appears in another branch of the FP-Tree. Therefore, file F7 is duplicated in the FP-Tree. A node-link is, therefore, generated between the file F7 nodes.

Figure 6:
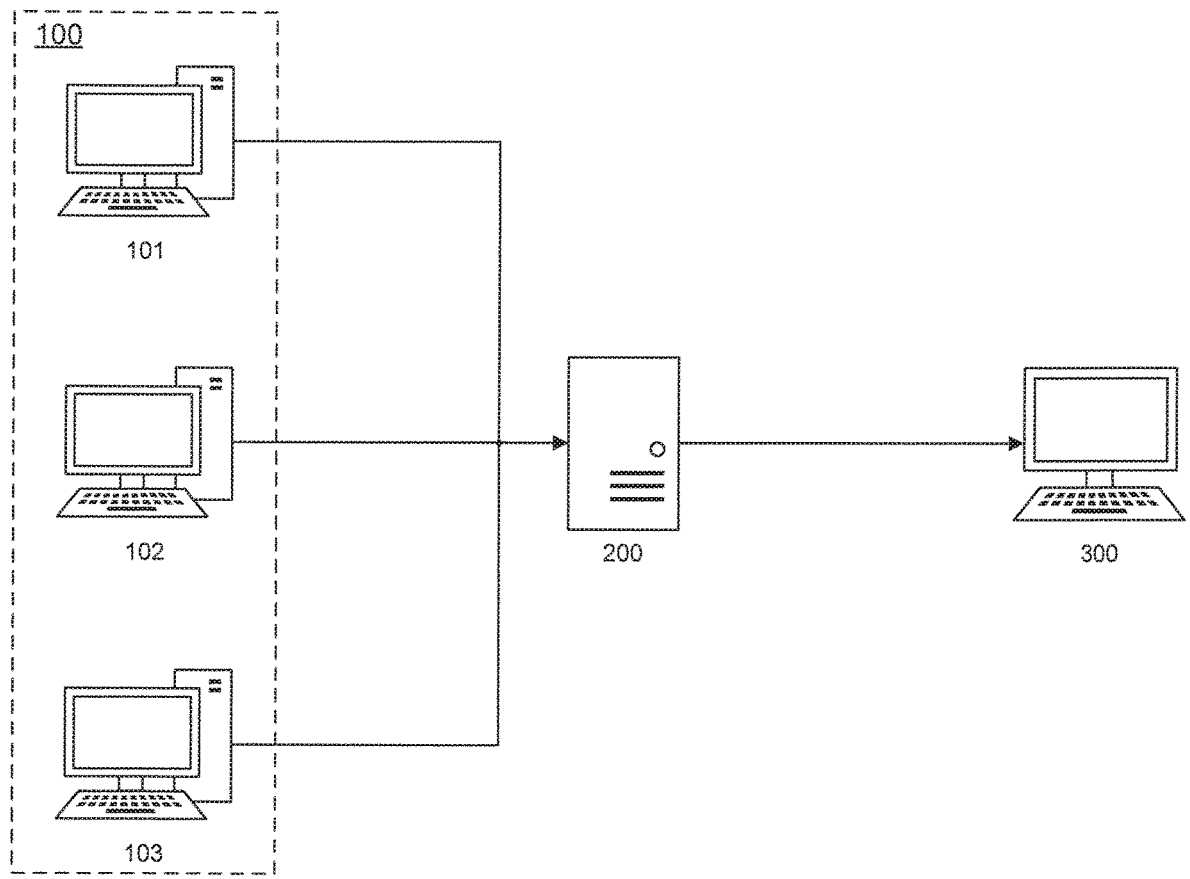
FIG. 6 is a block/flow diagram illustrating a high-level system/method for template based data reduction internet and cloud data mining, in accordance with the present principles.

Referring now to FIG. 6, a high-level system/method for template based data reduction for internet and cloud data mining is illustratively depicted in accordance with an embodiment of the present principles.

In one embodiment, an online monitoring and analysis system is contemplated. This online monitoring and analysis system (hereinafter "OMA system") can the monitoring and analysis of a group of computers 100 both independent features or events, and dependent features or events. For example, as tasks are performed on each of the computers 100, the processes run to perform those tasks are recorded, along with the files, libraries and other resources associated with each process. For example, opening a browser on the computer will call certain files, libraries, functions etc., and use a particular set of resources. Each of these aspects of opening up the browser can be recorded and logged. The performance of any task on the computer may be similarly recorded, including the performance of every task, file read/writes, process start, network communication, and any other event. Thus, a log of the events is continually growing for each computer in the group of computers 100.

Big data processing middleware 200 can be used to receive the log of events as an event stream. The event stream can be received, e.g., either at a set time, or in a continuous stream. If received in a continuous stream, the event stream can occur, e.g., either concurrently with the recording of the event log, or in a delayed fashion. The big data processing middleware 200 can receive and store the data pertaining to the event stream from all of the computers 100. As a result, the big data processing middleware 200 can include, e.g., a server or farm of servers, a cloud, a mainframe, or any other system or device suitable for accepting and processing the data from the computers 100. Processing of the data can include, e.g., data collection, sanitization, reduction, indexing, storage, and other processes. For example, because the event stream contains logs of event data from every event of each computer in the group of computers 200, a large volume of data is being received by the big data processing middleware 200. This volume of data can be up to 2 gigabytes per computer per day. Thus, for effective indexing, storage and later analysis, a data reduction scheme that can effectively compress the data without losing or degrading the information is beneficial to the OMA system. Indeed, effective data reduction can result in less storage space used by the big data processing middleware 200, fewer resources required to index the data, fewer resources required to send the data to an analysis system 300, among other benefits. Accordingly, the big data processing middleware 200 with an effective data reduction scheme can improve the performance, efficiency and cost of the OMA system.

Upon being processed by the big data processing middleware 200, the event stream may be received by the analysis system 300. The analysis system 300 analyzes the recorded data in the event stream including all processes, files, libraries, resources, etc. For example, the analysis system 300 can include, e.g., a dependency analysis system for analyzing security related information flow data (SRIFD) where processes run on the computers 100 and the files accessed in initial stages are recorded and analyzed. The analysis system 300 can, therefore, access the compressed data from the big data processing middleware 200 to analyze the events of each and all computers of the group of computers 100 to track the flow of information. In doing so, the analysis system 300 tracks the interaction of processes and files to determine if an activity is a threat, such as, e.g., an advanced persistent threat (APT) attack, among other security threats.

To more accurately determine threats, and avoid false negatives and false positives, the accuracy of the data being analyzed is important. If the data contains errors, such as, e.g., errors introduced during data reduction, a threat may not be recognized, resulting in potentially catastrophic consequences to the computers 200 or any sensitive information contained therein. However, by not reducing the data, a robust analysis may not be feasible or may not be performed in time to thwart a threat, such as an APT attack, before data is compromised. Thus, the reduction of data at the big data processing middleware 200 assists with increasing the speed and accuracy of the analysis system 300 by reducing the resource requirements of transferring and processing the potentially enormous amount of data from the computers 100.

Figure 7:
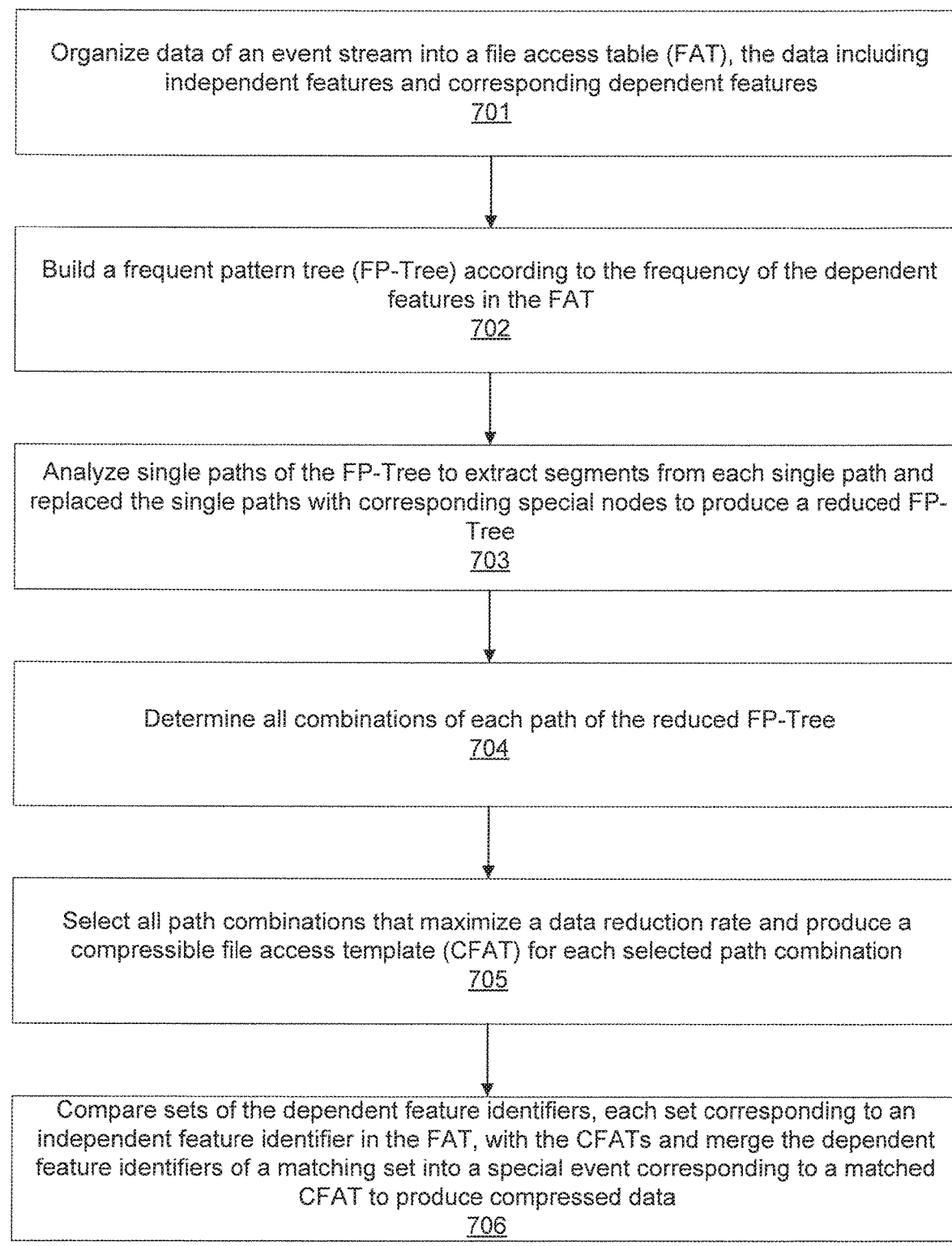
FIG. 7 is a flow diagram illustrating a system/method for template based data reduction, in accordance with the present principles.

Referring now to FIG. 7, a flow diagram illustrating a system/method for template based data reduction is illustratively depicted in accordance with an embodiment of the present principles.

At block 701, organize data of an event stream into a file access table (FAT), the data including independent features and corresponding dependent features.

The FAT includes a two column table with independent features or events, such as, e.g., processes in a computer, are entered into one column, and dependent events, such as, e.g., the files accessed in initial stages of a given process, in a second column. Dependent features or events can be ordered in the second column according to priority. The priority is determined by how frequently a given dependent feature or event occurs across all of the independent features or events.

At block 702, build a frequent pattern tree (FP-Tree) according to the frequency of the dependent features in the FAT The FP-Tree can include a node for each dependent feature or event with an associated counter for how often that node follows a parent node. Each dependent feature or event can be added as a node recursively by inspecting the dependent features or events of a given independent feature or event, and comparing a current dependent feature or event to a current node. If the current dependent feature or event matches the current node, then the current node counter is increased by one, otherwise a new node is added corresponding to the current dependent feature or event as a child of the current node.

At block 703, analyze single paths of the FP-Tree to extract segments from each single path and replaced the single paths with corresponding special nodes to produce a reduced FP-Tree.

The single paths include sections of the branches of the FP-Tree where each node has only one parent node and one child node. These single paths can be analyzed for all possible combinations forming segments with some minimum frequency of occurrence as defined by the smallest counter in the segment. These segments form segment candidates.

The segment candidates of each single path can be analyzed to produce a score for each segment candidate based on the size and frequency of the segment candidate being analyzed. For each single path, a list of the segment candidates can then be ordered by score and iteratively compared against a final segment list in descending order of score. Each segment candidate will be compared to every segment in the final segment list to assess whether the segment candidate intersects with any segments in the final segment list. If the segment candidate does not intersect with any segments in the final segment list, then it is added to the final segment list, otherwise it is not.

Additionally, all of the nodes of each single path of the FP-Tree can be merged into a special node, thus reducing the depth of the FP-Tree to the reduced FP-Tree. Each single path special node will have a corresponding final segment list of segments from that single path.

At block 704, determine all combinations of each path of the reduced FP-Tree.

The reduced FP-Tree having the special nodes can be analyzed to find all combinations of every path on the FP-Tree. Without replacing the single paths, which can become very long, with special nodes, determining all combinations of the paths can be very resource intensive and take a lot of time, storage and processing power. However, with the special nodes in place, a list of all of the path combinations can be produced.

The special nodes of the path combinations can then be replaced with the corresponding final segment list to produce a list of template candidates.

At block 705, select all path combinations that maximize a data reduction rate and produce a compressible file access template (CFAT) for each selected path combination.

The template candidate list can be scored according to a data reduction ratio based on the size and frequency of each path combination in the template candidate list. Similar to above, the path combinations can then be ordered according to score, such as, e.g., in descending order.

A final template list can then be produced where the path combinations can be added that maximize data reduction. As such, the template candidate list can be iteratively analyzed in, e.g., descending order to check if a given path combination contains, or is contained in a path combination added to the final template list. If the given path combination does contain, and is not contained in a path combination in the final template list, then it is added to the final template list, otherwise it is not added.

The final template list includes a set of path combinations, each of which form a CFAT that can be used to compress data.

At block 706, compare sets of the dependent feature identifiers, each set corresponding to an independent feature identifier in the FAT, with the CFATs and merge the dependent feature identifiers of a matching set into a special event corresponding to a matched CFAT to produce compressed data.

Each CFAT includes a combination of dependent features or events that frequently occurs in the FP-Tree. These CFATs can be compared to the data in the event stream such that the dependent features or events associated with a given independent feature or event can be merged with a matching CFAT to produce a special event. The special event facilitates the compression of the data by associate the given independent event with a relative small in size CFAT as opposed to a relatively large in size list of dependent features or events. Thus, the data can be compressed for smaller storage and more efficient processing without losing detail.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for mining commercial data, including:
   mining commercial activity data from a network of point of sale devices, the commercial activity data including at least one type of independent commercial event and corresponding dependent features;
   continuously collecting and compressing a stream of the commercial activity data from the network of point of sale devices with a middleware system;
   concurrently storing in a database compressed commercial activity data corresponding to the commercial activity data of the stream, wherein compressing the stream includes producing compressible file access templates (CFATs) according to frequent patterns of commercial activity data and replacing dependent feature sequences with a matching compressible file access template; and
   determining patterns in commercial activities across the network of point of sale devices using a commercial pattern analysis system.

2. The method of claim 1, wherein compressing the commercial activity data further includes building a frequent pattern tree (FP-Tree) including nodes corresponding to the dependent features according to a frequency of occurrence of the dependent features relative to the independent commercial events.

3. The method of claim 1, wherein compressing the commercial activity data further includes merging single paths of a FP-Tree corresponding to the event stream into a special not corresponding to dependent features of the commercial activity data.

4. The method of claim 1, wherein compressing the commercial activity data further includes:
   identifying all path combinations in a reduced FP-Tree formed by merging single paths of an FP-Tree corresponding to the commercial activity data into special nodes;
   generating the compressible file access template (CFAT) corresponding to each of the path combinations.

5. The method of claim 1, wherein the independent commercial event includes a consumer identifier corresponding to a consumer purchase.

6. The method of claim 1, wherein the network of point of sale devices include a plurality of physical point of sale devices located at stores and configured to upload commercial activities to the middleware system.

7. The method of claim 1, wherein the network of point of sale devices includes ecommerce webpages.

8. The method of claim 1, wherein the dependent features include items purchased.

* * * * *